United States Patent
Sasaki (10) Patent No.: US 11,426,716 B2
(45) Date of Patent: Aug. 30, 2022

(54) PLUGGED HONEYCOMB SEGMENT, AND PLUGGED HONEYCOMB STRUCTURE

(71) Applicant: NGK Insulators, Ltd., Nagoya (JP)

(72) Inventor: Yuji Sasaki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 16/989,034

(22) Filed: Aug. 10, 2020

(65) Prior Publication Data

US 2020/0384453 A1 Dec. 10, 2020

Related U.S. Application Data

(63) Continuation of application No. PCT/JP2018/013917, filed on Mar. 30, 2018.

(51) Int. Cl.
*B01J 35/04* (2006.01)
*B01D 53/88* (2006.01)
*C04B 38/00* (2006.01)

(52) U.S. Cl.
CPC ............ *B01J 35/04* (2013.01); *B01D 53/885* (2013.01); *C04B 38/0009* (2013.01); *B01D 2255/9202* (2013.01); *B01D 2255/9205* (2013.01)

(58) Field of Classification Search
None
See application file for complete search history.

(56) References Cited

U.S. PATENT DOCUMENTS

2005/0011174 A1 1/2005 Hong et al.
2009/0246458 A1 10/2009 Yamada et al.

2014/0059987 A1 3/2014 Hirakawa et al.
2014/0298779 A1 10/2014 Miyairi
2016/0263567 A1 9/2016 Mori
(Continued)

FOREIGN PATENT DOCUMENTS

JP 2001-334114 A1 12/2001
JP 2009-240864 A1 10/2009
(Continued)

OTHER PUBLICATIONS

Koichi et al., machine translation of JP 5313878 Abstract, Description and Claims, Oct. 9, 2013 (Year: 2013).*

(Continued)

*Primary Examiner* — Mary I Omori
(74) *Attorney, Agent, or Firm* — Burr & Brown, PLLC (57) ABSTRACT

A plugged honeycomb segment includes a honeycomb segment having a quadrangular prism shape which includes porous partition walls arranged to surround a plurality of cells and an outermost circumferential wall, and a plugging portion, wherein a porosity of the partition walls is 30 to 70%, in a cross section orthogonal to the cell extending direction, an inflow cell surrounded by the partition walls is a hexagon, and an outflow cell is a square, one outflow cell is surrounded by four inflow cells, the cell located at the outermost circumference includes a complete cell and an incomplete cell, and a thickness of the outermost circumferential wall in contact with the incomplete cell (T1), a thickness of the outermost circumferential wall in contact with the complete cell (T2), and a thickness of the partition walls (WT), satisfy 0.200 mm<T1<T2−(½×WT) and T2≤0.700 mm.

5 Claims, 4 Drawing Sheets (56) References Cited

U.S. PATENT DOCUMENTS

| | | | |
|---|---|---|---|
| 2017/0056804 A1* | 3/2017 | Mori | B01D 46/247 |
| 2017/0197167 A1* | 7/2017 | Shibata | C04B 38/0006 |
| 2017/0197168 A1 | 7/2017 | Shibata et al. | |

FOREIGN PATENT DOCUMENTS

| | | | | |
|---|---|---|---|---|
| JP | 2010-131586 A1 | 6/2010 | | |
| JP | 5313878 B2 * | 10/2013 | | C04B 38/0009 |
| JP | 2014-050793 A1 | 3/2014 | | |
| JP | 2014-200741 A1 | 10/2014 | | |
| JP | 2016-168561 A1 | 9/2016 | | |
| WO | 2004/024293 A1 | 3/2004 | | |
| WO | 2016/013511 A1 | 1/2016 | | |
| WO | 2016/013513 A1 | 1/2016 | | |

OTHER PUBLICATIONS

International Search Report and Written Opinion (Application No. PCT/JP2018/013917) dated Jun. 26, 2018.

* cited by examiner

PLUGGED HONEYCOMB SEGMENT, AND PLUGGED HONEYCOMB STRUCTURE

BACKGROUND OF THE INVENTION

Field of the Invention

The present invention relates to a plugged honeycomb segment and a plugged honeycomb structure. More specifically, the present invention relates to a plugged honeycomb segment and a plugged honeycomb structure in which the pressure loss is low, cells are less likely to be clogged when a catalyst is loaded, and the temperature rising property and the isostatic strength (for example, tightening resistance) are excellent.

Description of the Related Art

In recent years, reduction of fuel consumption of automobiles has been demanded from the viewpoint of impact on the global environment and resource saving. Therefore, internal combustion engines with high thermal efficiency such as a direct injection gasoline engine or a diesel engine tend to be used as a power source for automobiles.

On the other hand, in these internal combustion engines, the generation of burnt residue when fuel is combusted is a problem. From the perspective of the atmospheric environment, it is required to take measures to prevent the release of particulate matter (hereinafter sometimes referred to as "PM") such as soot and ash to the atmosphere as well as removing toxic components contained in exhaust gas.

In particular, regulations regarding the removal of PM emitted from automobile engines and the like tend to be tightened worldwide. In view of this, the use of an exhaust gas purifying filter having a honeycomb structure has attracted attention as a trapping filter for removing PM, and various systems have been proposed. The exhaust gas purifying filter having a honeycomb structure is usually one in which a plurality of cells serving as fluid flow paths are defined and formed by porous partition walls, and has a structure that the cells are alternately plugged so that the porous partition walls that form the cells function as a filter. A structure having a pillar shape in which a plurality of cells are defined and formed by porous partition walls may be referred to as a "honeycomb structure". In addition, one in which open ends of cells formed in a honeycomb structure are plugged by plugging portions may be referred to as a "plugged honeycomb structure". The plugged honeycomb structure is widely used as a gas purifying filter. When exhaust gas containing particulate matter flows in through an inflow end face (first end face) of the plugged honeycomb structure, at the time the exhaust gas passes through partition walls, the particulate matter in the exhaust gas is filtered, and purified gas is discharged through an outflow end face (second end face) of the plugged honeycomb structure.

Conventionally, as the shape of the cells of the plugged honeycomb structure, there have been given square cells, hexagonal cells, HAC cells (cells in which octagons and squares are combined), and the like. Recently, development of new plugged honeycomb structures in which cells having different shapes are combined and in which positions of plugging are devised have been progressed (see, for example, Patent Document 1). According to such plugged honeycomb structures, it is possible to suppress the generation of cracks during PM combustion and deposit a large amount of ash on the partition walls while reducing both the pressure loss at the initial stage of use and the pressure loss at the time of PM deposition.

[Patent Document 1] JP-A-2014-200741

SUMMARY OF THE INVENTION

Conventionally, when a plugged honeycomb structure is installed in an internal combustion engine of an automobile or the like and used as a gas purifying filter, it is common to manufacture the plugged honeycomb structure as a round pillar shape having a specific size. As such a plugged honeycomb structure, for example, a plugged honeycomb structure having a segmented structure in which a plurality of honeycomb segments are bonded to each other by a bonding material has been proposed.

When the plugged honeycomb structure having a cell structure as described in Patent Document 1 is used as a plugged honeycomb structure having a segmented structure, for some cells located at the outermost circumference of each honeycomb segment, the size of the open ends thereof is reduced by about ½ of the partition wall thickness. Further, as described above, there is a problem that the pressure loss of the plugged honeycomb structure becomes high because the size of the open ends of some cells located at the outermost circumference of each honeycomb segment is reduced.

In addition, in the plugged honeycomb structure used as an exhaust gas purifying filter, in order to impart a predetermined purifying performance, a catalyst for purifying exhaust gas may be loaded on partition walls arranged so as to surround cells serving as flow paths. As described above, there is a problem that, in the honeycomb segment, if the size of the open ends of some cells located at the outermost circumference is reduced, when the catalyst is loaded, the catalyst is easily clogged in the cells whose open end is reduced in size. Further, the catalyst is loaded in such a manner that a catalyst slurry in which the catalyst is suspended in the liquid is sucked from one end face side of the plugged honeycomb structure. However, there is a problem that a uniform suction force is not obtained, and the loading of the catalyst becomes non-uniform.

The present invention has been made in view of such problems of the conventional art. According to the present invention, there is provided a plugged honeycomb segment and a plugged honeycomb structure in which the pressure loss is low, cells are less likely to be clogged when a catalyst is loaded, and the temperature rising property and the isostatic strength are excellent.

According to the present invention, the following plugged honeycomb structure and plugged honeycomb segment are provided.

According to a first aspect of the present invention, a plugged honeycomb segment is provided including:

a honeycomb segment having a quadrangular prism shape which includes porous partition walls arranged so as to surround a plurality of cells extending from an inflow end face to an outflow end face, and an outermost circumferential wall arranged at an outermost circumference; and a plugging portion arranged at any one end of the inflow end face side or the outflow end face side of each of the cells, in which a porosity of each of the partition walls is 30 to 70%, the cell in which the plugging portion is arranged at an end on the outflow end face side is an inflow cell, and the cell in which the plugging portion is arranged at an end on the inflow end face side is an outflow cell, in a cross section orthogonal to an extending direction of the cells, a shape of the inflow cell surrounded by the partition walls is a hexagon, and a shape of the outflow cell surrounded by the partition walls is a square, the plurality of cells have a structure that one outflow cell is surrounded by four inflow cells so that one side of a predetermined inflow cell and one side of an adjacent outflow cell have the same length and become parallel except for a region of the outermost circumference of the honeycomb segment, the cell located at the outermost circumference of the honeycomb segment includes a complete cell having the same shape as the cell surrounded by the partition walls, and an incomplete cell in which a part of a shape of the cell surrounded by the partition walls is divided by the outermost circumferential wall, and assuming that a thickness of the outermost circumferential wall in contact with the incomplete cell is T1 (mm), a thickness of the outermost circumferential wall in contact with the complete cell is T2 (mm), and a thickness of each of the partition walls is WT (mm), the relationships of the following expression (1) and expression (2) are satisfied.

$$0.200 \text{ mm} < T1 < T2 - (\tfrac{1}{2} \times WT) \quad \text{Expression (1)}$$

$$T2 \leq 0.700 \text{ mm} \quad \text{Expression (2)}$$

According to a second aspect of the present invention, the plugged honeycomb segment according to the first aspect is provided, in which the outermost circumferential wall having a thickness of T2 (mm) is located at a corner of an end face of the honeycomb segment.

According to a third aspect of the present invention, the plugged honeycomb segment according to the first or second aspects is provided, in which the thickness of each of the partition walls is 0.100 to 0.450 mm.

According to a fourth aspect of the present invention, the plugged honeycomb segment according to any one of the first to third aspects is provided, in which a cell density is 15 to 78 cells/cm$^2$.

According to a fifth aspect of the present invention, a plugged honeycomb structure including:

a plurality of plugged honeycomb segments according to any one of the first to fourth aspects is provided;

a bonding layer that bonds side faces of the plurality of plugged honeycomb segments to each other; and a bonded-body circumferential wall arranged so as to surround side faces of a bonded body of the plugged honeycomb segments bonded by the bonding layer.

The plugged honeycomb segment of the present invention has an effect that the pressure loss is low, the cells are less likely to be clogged when the catalyst is loaded, and the temperature rising property and the isostatic strength are excellent. That is, T1 (mm) which is the thickness of the outermost circumferential wall in contact with the incomplete cell is set so as to satisfy the above expression (1), and T2 (mm) which is the thickness of the outermost circumferential wall in contact with the complete cell is set so as to satisfy the above expression (2), so that the increase in pressure loss can be effectively suppressed. Furthermore, by being set so as to satisfy the above expression (1) and expression (2), the cells are less likely to be clogged when the catalyst is loaded, which contributes to improvement in the temperature rising property and the isostatic strength (for example, tightening resistance). Furthermore, the plugged honeycomb segment of the present invention also has an effect that the bonding strength of the bonding layer is excellent when the plurality of plugged honeycomb segments are bonded by the bonding layer.

The plugged honeycomb structure of the present invention is a plugged honeycomb structure in which the plurality of the plugged honeycomb segments of the present invention described above are bonded by the bonding layer. Therefore, also the plugged honeycomb structure of the present invention has an effect that the pressure loss is low, the cells are less likely to be clogged when the catalyst is loaded, and the temperature rising property and the isostatic strength are excellent. Furthermore, the plugged honeycomb structure of the present invention also has an effect that the bonding strength of the bonding layer is excellent.

DESCRIPTION OF THE PREFERRED EMBODIMENTS

Hereinafter, embodiments of the present invention will be described, but the present invention is not limited to the following embodiments. Therefore, it should be understood that, without departing from the spirit of the present invention, those obtained by appropriately modifying and improving the following embodiments are also included in the scope of the present invention based on the ordinary knowledge of those skilled in the art.

Figure 1:
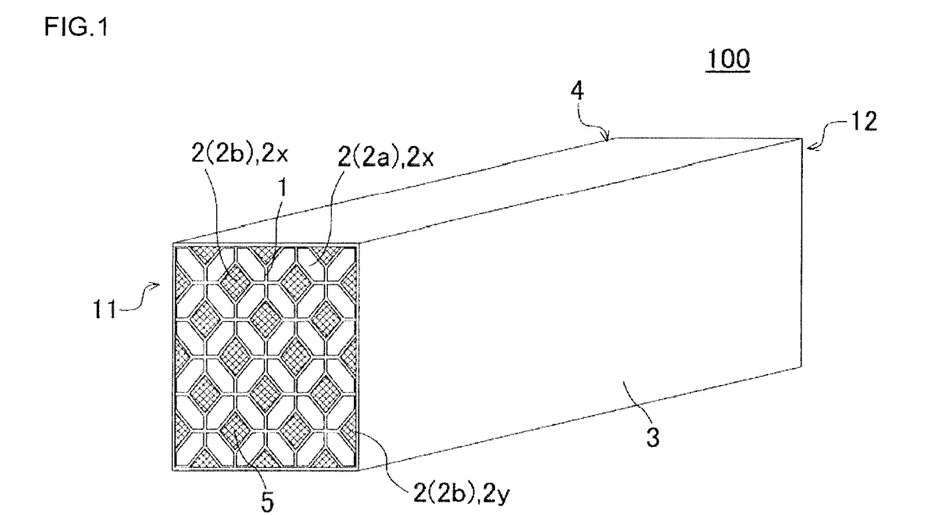
FIG. 1 is a perspective view schematically showing one embodiment of a plugged honeycomb segment of the present invention as viewed from an inflow end face side.
Figure 2:
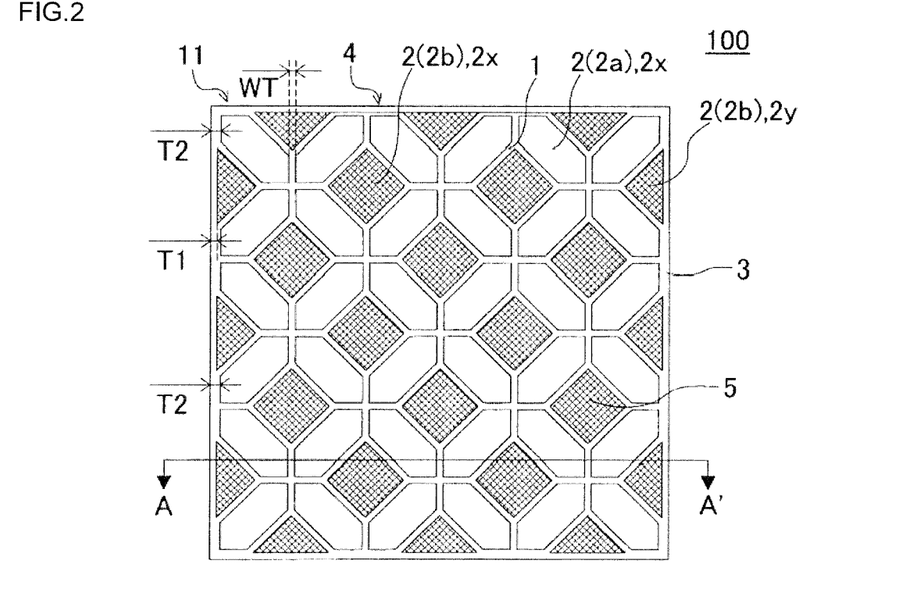
FIG. 2 is a plan view schematically showing the inflow end face of the plugged honeycomb segment of FIG. 1.
Figure 3:
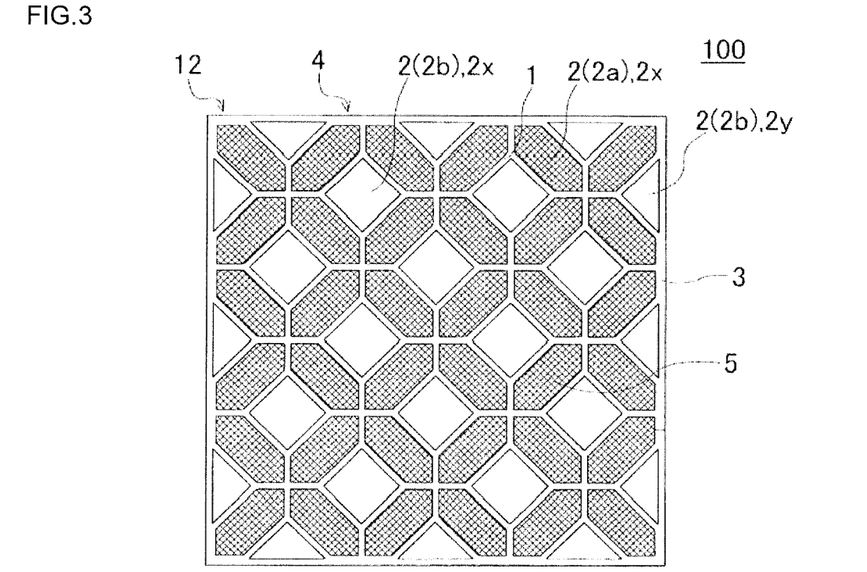
FIG. 3 is a plan view schematically showing an outflow end face of the plugged honeycomb segment of FIG. 1.
Figure 4:
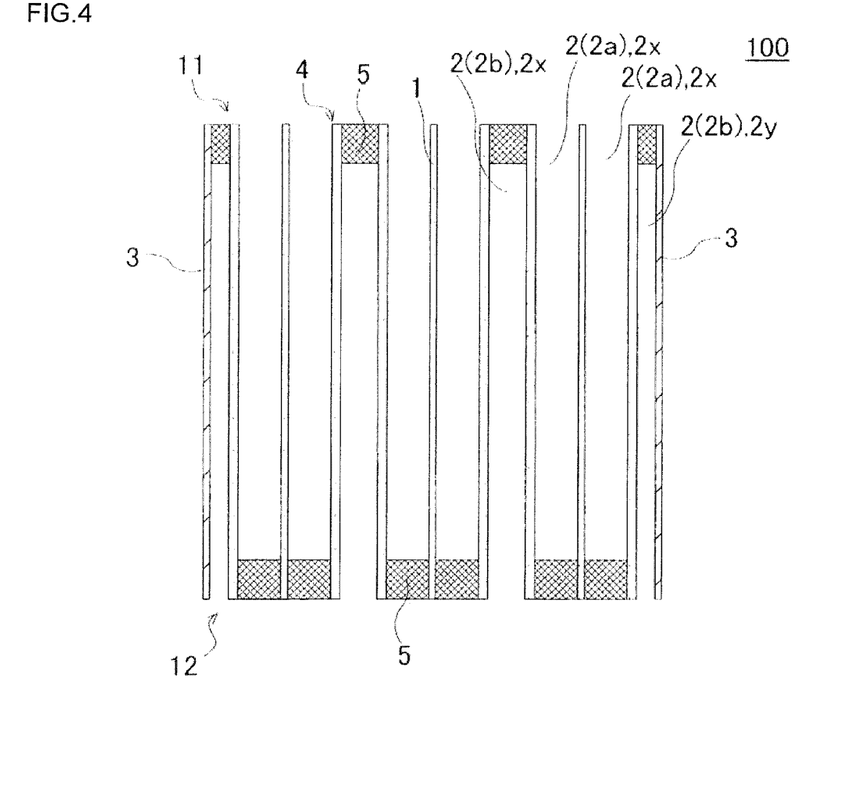
FIG. 4 is a cross-sectional view schematically showing a cross section taken along the line A-A' of FIG. 2.
Figure 5:
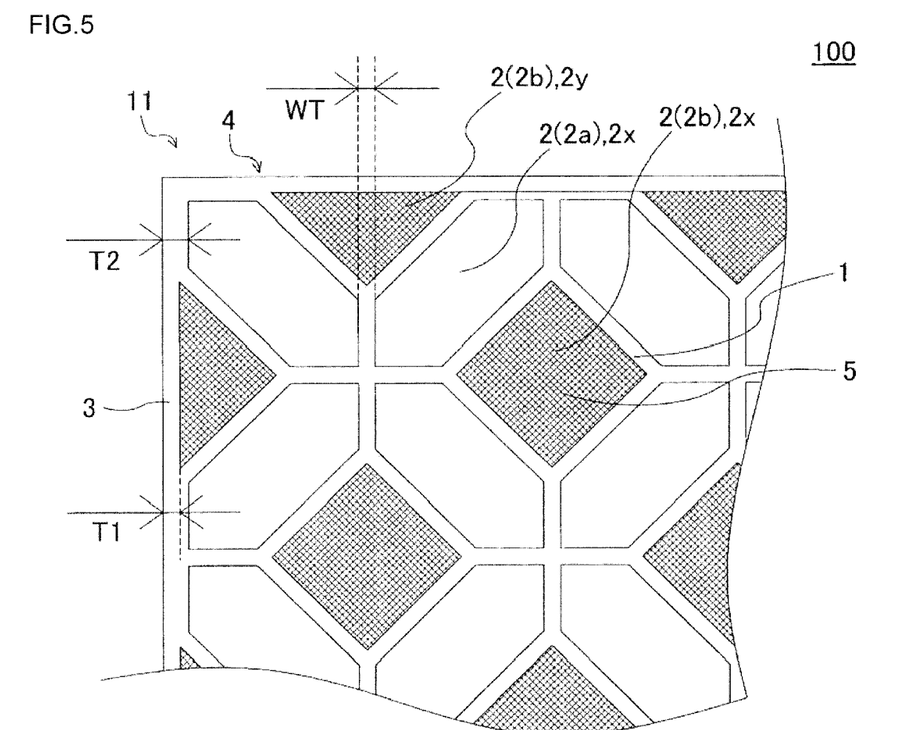
FIG. 5 is an enlarged plan view in which a part of FIG. 2 is enlarged.

(1) Plugged Honeycomb Segment:

One embodiment of a plugged honeycomb segment of the present invention is a plugged honeycomb segment 100 as shown in FIGS. 1 to 5. The plugged honeycomb segment 100 includes a quadrangular prism-shaped honeycomb segment 4 and plugging portions 5. Here, the honeycomb segment 4 is shown in FIG. 1 as a perspective view schematically showing the embodiment of the plugged honeycomb segment of the present invention as viewed from an inflow end face side. FIG. 2 is a plan view schematically showing the inflow end face of the plugged honeycomb segment of FIG. 1. FIG. 3 is a plan view schematically showing an outflow end face of the plugged honeycomb segment of FIG. 1. FIG. 4 is a cross-sectional view schematically showing a cross section taken along the line A-A' of FIG. 2. FIG. 5 is an enlarged plan view in which a part of FIG. 2 is enlarged.

The honeycomb segment 4 includes porous partition walls 1 arranged so as to surround a plurality of cells 2 extending from an inflow end face 11 to an outflow end face 12, and an outermost circumferential wall 3 arranged at the outermost circumference. The honeycomb segment 4 is a quadrangular prism shape having the inflow end face 11 and the outflow end face 12 as both end faces and the outermost circumferential wall 3 as side faces. The porosity of the partition walls 1 forming the honeycomb segment 4 is 30 to 70%. The average pore diameter of the partition walls 1 is a value measured by the mercury press-in method. The measurement of the partition walls 1 can be performed using, for example, Autopore 9500 (trade name) manufactured by Micromeritics, in the same manner as the measurement of the porosity.

Hereinafter, in the honeycomb segment 4 of the present embodiment, the cells 2 in which the plugging portions 5 are arranged at the ends on the outflow end face 12 side are referred to as inflow cells 2a, and further, the cells in which the plugging portions 5 are arranged at the ends on the inflow end face 11 side are referred to as outflow cells 2b.

In the honeycomb segment 4 of the present embodiment, in a cross section orthogonal to the extending direction of the cells 2, the shape of the inflow cells 2a surrounded by the partition walls 1 is a hexagon, and the shape of the outflow cells 2b surrounded by the partition walls 1 is a square. In addition, the plurality of cells 2 have a structure that one outflow cell 2b is surrounded by four inflow cells 2a so that one side of a predetermined inflow cell 2a and one side of an adjacent outflow cell 2b have the same length and become parallel except for the region of the outermost circumference of the honeycomb segment 4. That is, in the honeycomb segment 4, cells 2 having two types of shapes (that is, hexagon and square) are formed so as to have a predetermined repeating array pattern in the cross section orthogonal to the extending direction of the cells 2. The above-mentioned "repeating array pattern" is an array pattern composed of one outflow cell 2b and four inflow cells 2a, in which two or more array patterns are present in one honeycomb segment 4. Hereinafter, the shape of the cells 2 in the cross section orthogonal to the extending direction of the cells 2 may be referred to as a "cell shape", a "cross section shape", and a "shape of a cross section". Note that, in the region of the outermost circumference of the honeycomb segment 4, a portion which is incomplete in the structure of the cells 2 (in other words, the repeating array pattern) is present due to the outermost circumferential wall 3. From this, the structure of the cells 2 of the honeycomb segment 4 described above relates to the region excluding the region of the outermost circumference of the honeycomb segment 4.

The cells 2 located at the outermost circumference of the honeycomb segment 4 include complete cells 2x having the same shape as the cells 2 surrounded by the partition walls 1, and incomplete cells 2y in which a part of the shape of the cells 2 surrounded by the partition walls 1 is divided by the outermost circumferential wall 3. That is, the complete cells 2x are hexagonal inflow cells 2a or square outflow cells 2b, and the incomplete cells 2y are non-hexagonal inflow cells 2a or non-square outflow cells 2b.

The plugged honeycomb segment 100 of the present embodiment has an important technical feature that it satisfies the relationships of the following expression (1) and expression (2). Note that, in the following expression (1) and expression (2), T1 (mm) represents the thickness of the outermost circumferential wall 3 in contact with the incomplete cell 2y. T2 (mm) represents the thickness of the outermost circumferential wall 3 in contact with the complete cell 2x. WT (mm) represents the thickness of the partition wall 1.

$$0.200 \text{ mm} < T1 < T2 - (\tfrac{1}{2} \times WT) \quad \text{Expression (1):}$$

$$T2 \leq 0.700 \text{ mm} \quad \text{Expression (2):}$$

The plugged honeycomb segment 100 of the present embodiment has an effect that the pressure loss is low, the cells 2 are less likely to be clogged when a catalyst is loaded, and the temperature rising property and the isostatic strength are excellent. That is, the thickness T1 (mm) of the outermost circumferential wall 3 in contact with the incomplete cell 2y is set so as to satisfy the above expression (1), and the thickness T2 (mm) of the outermost circumferential wall 3 in contact with the complete cell 2x is set so as to satisfy the above expression (2), so that the thickness T1 (mm) of the outermost circumferential wall 3 in contact with the incomplete cell 2y is relatively thinner than the thickness T2 (mm). Therefore, the increase in pressure loss can be effectively suppressed. Further, the thickness T1 (mm) of the outermost circumferential wall 3 in contact with the incomplete cell 2y is relatively thin, which means that the area of the open end of the incomplete cell 2y is relatively large, and hence the incomplete cell 2y is less likely to be clogged when the catalyst is loaded. Furthermore, since the thickness T1 (mm) of the outermost circumferential wall 3 in contact with the incomplete cells 2y is relatively thin, it is possible to reduce the weight of the plugged honeycomb segment 100 and improve the temperature rising property.

Furthermore, the plugged honeycomb segment 100 of the present embodiment also has an effect that the bonding strength of a bonding layer is excellent when a plurality of plugged honeycomb segments are bonded by the bonding layer. That is, the thickness T2 (mm) of the outermost circumferential wall 3 in contact with the complete cell 2x is set to 0.700 mm or less, and the thickness T1 (mm) of the outermost circumferential wall 3 in contact with the incomplete cell 2y is set to be relatively thinner than the thickness T2 (mm), so that the water absorption amount of the outermost circumferential wall 3 can be reduced. If the water absorption amount of the outermost circumferential wall 3 increases, the bonding material for forming the bonding layer is likely to sink (for example, the center of the bonding material tends to become sparse), and the bonding strength of the bonding layer decreases. In the plugged honeycomb segment 100 of the present embodiment, the bonding material is less likely to sink, and the bonding strength of the bonding layer can be improved.

In the plugged honeycomb segment 100, if the porosity of the partition walls 1 is less than 30%, it is not preferable because the pressure loss after the catalyst is loaded becomes high. Further, if the porosity of the partition walls 1 exceeds 70%, it is not preferable because the mechanical strength (isostatic strength) becomes low. The porosity of the partition walls 1 is preferably 40 to 65%.

If the thickness T1 (mm) of the outermost circumferential wall 3 in contact with the incomplete cell 2y is less than 0.200 mm, the strength of the plugged honeycomb segment 100 decreases. If the thickness T1 (mm) of the outermost circumferential wall 3 in contact with the incomplete cell 2y exceeds the value of "T2−(½WT)", the pressure loss becomes high, and further, the cells 2 are likely to be clogged when the catalyst is loaded.

If the thickness T2 (mm) of the outermost circumferential wall 3 in contact with the complete cell 2x exceeds 0.700 mm, the pressure loss becomes high and the temperature rising property also deteriorates. The thickness T2 (mm) of the outermost circumferential wall 3 in contact with the complete cell 2x is preferably 0.500 mm or less.

In the plugged honeycomb segment 100 of the present embodiment, it is preferred that, as shown in FIGS. 2 and 4, the outermost circumferential wall 3 having the thickness of T2 (mm) be located at a corner of the end face of the honeycomb segment 4. With such a configuration, the effect that the pressure loss is low, the cells 2 are less likely to be clogged when the catalyst is loaded, and the temperature rising property and the isostatic strength are excellent is more easily achieved.

Figure 6:
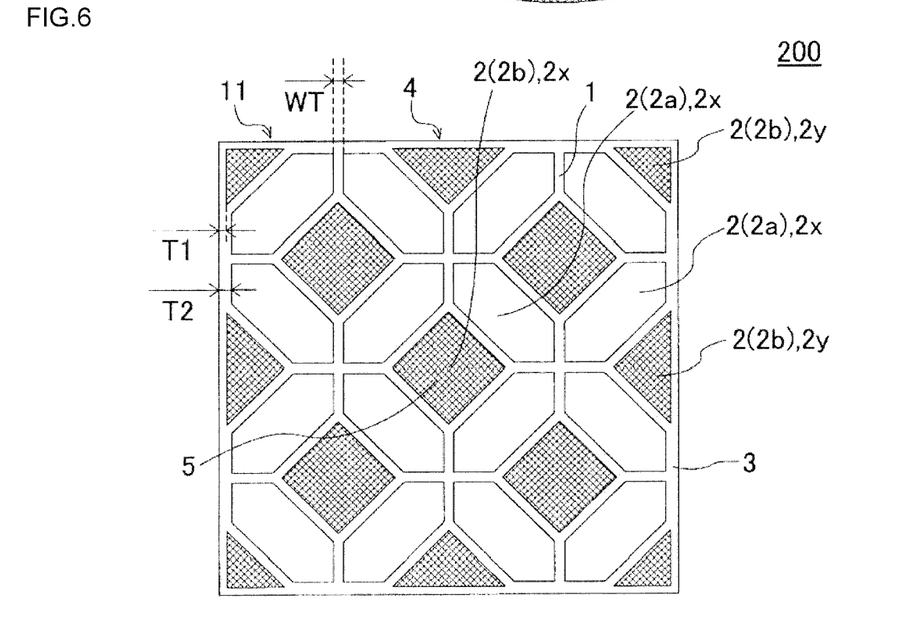
FIG. 6 is a plan view schematically showing an inflow end face of another embodiment of the plugged honeycomb segment of the present invention.

Note that, the plugged honeycomb segment of the present invention may have, for example, a cell structure configured as shown in FIG. 6. Here, FIG. 6 is a plan view schematically showing an inflow end face of another embodiment of the plugged honeycomb segment of the present invention. A plugged honeycomb segment 200 shown in FIG. 6 is configured so that the arrangement of the cells 2 located at the outermost circumference is different from that of the plugged honeycomb segment 100 shown in FIGS. 1 to 5. In the plugged honeycomb segment 200 shown in FIG. 6, the outermost circumferential wall 3 having the thickness of T2 (mm) is located only at the portion corresponding to each side of the end face of the honeycomb segment 4. In FIG. 6, the same components as those of the plugged honeycomb segment 100 shown in FIGS. 1 to 5 are designated by the same reference numerals, and the description thereof will be omitted.

The thickness WT (mm) of the partition wall 1 is preferably 0.100 to 0.450 mm, more preferably 0.150 to 0.310 mm, and particularly preferably 0.150 to 0.210 mm. When the thickness WT (mm) of the partition wall 1 is less than 0.100 mm, the strength of the plugged honeycomb segment 100 may decrease. When the thickness WT (mm) of the partition wall 1 exceeds 0.450 mm, the pressure loss increases and the temperature rising property also deteriorates.

The cell density of the honeycomb segment 4 is preferably 15 to 78 cells/cm$^2$, more preferably 15 to 46 cells/cm$^2$, and particularly preferably 31 to 46 cells/cm$^2$. If the cell density of the honeycomb segment 4 is less than 15 cells/cm$^2$, it is not preferable because the pressure loss becomes high when particulate matter such as soot adheres to the partition walls. If the cell density of the honeycomb segment 4 exceeds 78 cells/cm$^2$, it is not preferable because the initial pressure loss easily increases and high pressure loss due to soot clogging easily occurs.

The material forming the partition wall 1 is not particularly limited. For example, it is preferable that the material forming the partition wall 1 contain at least one kind selected from the group consisting of silicon carbide, cordierite, silicon-silicon carbide composite material, cordierite-silicon carbide composite material, silicon nitride, mullite, alumina, and aluminum titanate. The material forming the partition wall 1 is a material containing the materials listed in the above group at preferably 30 mass % or more; more preferably 40 mass % or more, and particularly preferably 50 mass % or more. Note that, the silicon-silicon carbide composite material is a composite material formed using silicon carbide as aggregates and silicon as a binder. Further, the cordierite-silicon carbide composite material is a composite material formed using silicon carbide as aggregates and cordierite as a binder.

The material of the plugging portion 5 is not particularly limited. It is preferable that the material of the plugging portion 5 contain one kind or two or more kinds selected from the various ceramics mentioned above as the preferable materials of the honeycomb segment.

The size of the honeycomb segment 4 is not particularly limited. However, if the size of one honeycomb segment 4 is too large, in a plugged honeycomb structure manufactured by bonding a plurality of plugged honeycomb segments 100, the effect of preventing occurrence of cracks may not be sufficiently exerted. Further, if the size of one honeycomb segment 4 is too small, the bonding work of the bonding layer of the honeycomb segment 4 may be complicated.

Figure 7:
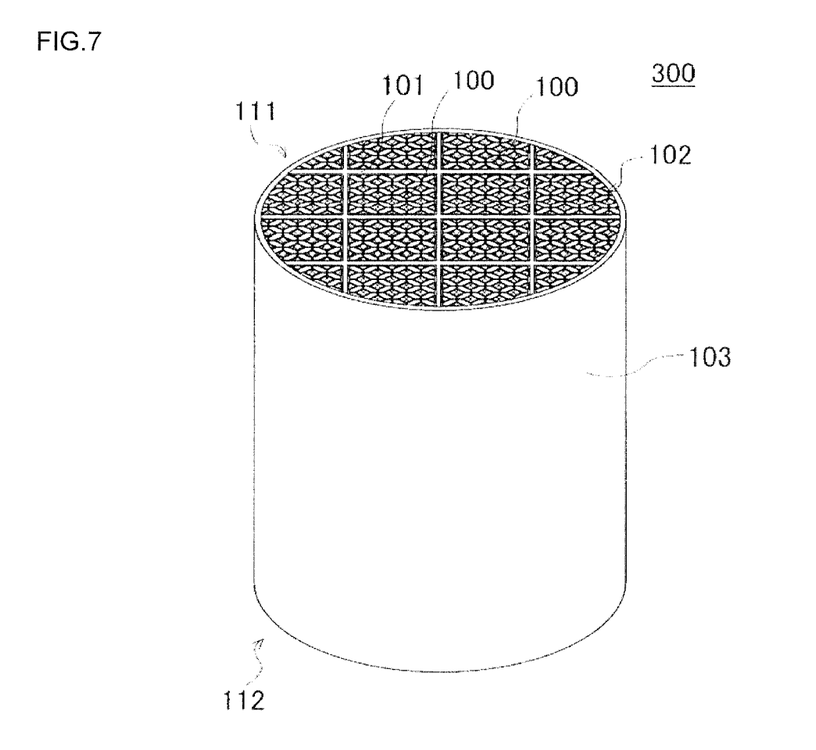
FIG. 7 is a perspective view schematically showing one embodiment of a plugged honeycomb structure of the present invention as viewed from an inflow end face side.

(2) Plugged Honeycomb Structure:

Next, an embodiment of a plugged honeycomb structure of the present invention will be described with reference to FIG. 7. FIG. 7 is a perspective view schematically showing the embodiment of the plugged honeycomb structure of the present invention as viewed from an inflow end face side.

As shown in FIG. 7, a plugged honeycomb structure 300 of the present embodiment includes a plurality of plugged honeycomb segments 100, bonding layers 101, and a bonded-body circumferential wall 103. That is, the plugged honeycomb structure 300 of the present embodiment is a so-called plugged honeycomb structure 300 having a segmented structure. On the circumference of the plugged honeycomb structure 300, the bonded-body circumferential wall 103 is arranged so as to surround the plurality of plugged honeycomb segments 100.

The plugged honeycomb segment 100 has the same structure as the plugged honeycomb segment 100 shown in FIGS. 1 to 5. In the plugged honeycomb structure 300, the bonded body of the plugged honeycomb segments 100 is formed by bonding side faces of the plurality of plugged honeycomb segments 100 to each other via the bonding layer 101. Note that, among the plurality of plugged honeycomb segments 100, the plugged honeycomb segments 100 arranged in the circumferential portion in contact with the bonded-body circumferential wall 103 are each formed in a pillar shape in which a part of the plugged honeycomb segment 100 formed in a quadrangular prism shape is ground along the shape of the bonded-body circumferential wall 103.

The bonding layer 101 is made of a bonding material that bonds the side faces of the plurality of plugged honeycomb segments 100 to each other. The bonded body in which the plurality of plugged honeycomb segments 100 are bonded to each other via the bonding layers 101 may be referred to as a plugged honeycomb segment bonded body 102.

The plugged honeycomb structure 300 of the present embodiment can be suitably used as a trapping filter for removing particulate matter contained in exhaust gas. The plugged honeycomb structure 300 of the present embodiment has an effect that the pressure loss is low, the cells 2 are less likely to be clogged when the catalyst is loaded, and the temperature rising property and the isostatic strength are excellent. Furthermore, the plugged honeycomb structure 300 of the present embodiment also has an effect that the bonding strength of the bonding layer 101 is excellent.

The overall shape of the plugged honeycomb structure 300 is not particularly limited. For example, the overall shape of the plugged honeycomb structure 300 shown in FIG. 7 is a round pillar shape in which an inflow end face 111 and an outflow end face 112 have a circular shape. In addition, although not shown, the overall shape of the plugged honeycomb structure may be a pillar shape in which the inflow end face and the outflow end face have a substantially circular shape such as an elliptical shape, a racetrack shape, or an oval shape. Further, the overall shape of the plugged honeycomb structure may be a prismatic columnar shape in which the inflow end face and the outflow end face have a polygonal shape such as a quadrangle and a hexagon.

The thickness of the bonding layer 101 is not particularly limited. For example, the thickness of the bonding layer 101 is preferably 0.5 to 2.0 mm, more preferably 0.5 to 1.5 mm, and particularly preferably 0.5 to 1.0 mm. If the thickness of the bonding layer 101 is less than 0.5 mm, it is not preferable because the thermal shock resistance of the plugged honeycomb structure 300 may decrease. If the thickness of the bonding layer 101 exceeds 2.0 mm, it is not preferable because the pressure loss may become high.

(3) Manufacturing Method for Plugged Honeycomb Structure:

Next, a manufacturing method for the plugged honeycomb structure 300 of the present embodiment will be described. When the plugged honeycomb structure 300 is manufactured, first, the plugged honeycomb segment 100 as shown in FIGS. 1 to 5 is manufactured by the following method.

First, a plastic kneaded material for manufacturing a honeycomb segment is prepared. The kneaded material for manufacturing the honeycomb segment can be prepared by appropriately adding an additive such as a binder and water to raw material powder. As the raw material powder, such raw material powder that the partition wall of the honeycomb segment becomes the suitable material for the partition wall described above can be appropriately selected and used.

Next, through extrusion of the kneaded material obtained in this manner, a honeycomb formed body having a quadrangular prism shape which includes partition walls arranged so as to surround a plurality of cells, and an outermost circumferential wall arranged at the outermost circumference is manufactured. A plurality of honeycomb formed body are manufactured.

Plugging portions are formed in such a manner that the obtained honeycomb formed body is dried, for example, with microwaves and hot air, and open ends of the cells are plugged with the same material as that used for manufacturing the honeycomb formed body. The honeycomb formed body may be further dried after the plugging portions are formed.

Next, the honeycomb formed body having the plugging portions formed therein is fired to obtain a plugged honeycomb segment. The firing temperature and firing atmosphere differ depending on the raw material, and those skilled in the art can select the firing temperature and firing atmosphere that are optimal for the selected material. Next, a plurality of plugged honeycomb segments are bonded to each other using a bonding material, and dried and cured, and then the circumference is processed to have a desired shape, so that a plugged honeycomb structure having a segmented structure can be obtained.

As the bonding material, a material obtained by adding a liquid medium such as water to a ceramic material to form a paste can be used. Further, since the processed face after the circumference of the bonded body of the plugged honeycomb segments is processed is in a state where the cells are exposed, a circumferential coating material may be applied to the processed face to form the bonded-body circumferential wall 103 as shown in FIG. 7. As the material of the circumferential coating material, for example, the same material as the material of the bonding material can be used.

EXAMPLES

Example 1

As a ceramic raw material, a mixed raw material obtained by mixing silicon carbide (SiC) powder and metallic silicon (Si) powder in a mass ratio of 80:20 was prepared. Hydroxypropylmethyl cellulose as a binder and a water absorbable resin as a pore former were added to this mixed raw material, and water was also added to prepare a forming raw material. The obtained forming raw material was kneaded using a kneader to obtain a kneaded material.

Next, the obtained kneaded material was molded by using a vacuum extrusion molding machine to manufacture forty-nine honeycomb segments having a quadrangular prism shape and a repeating array pattern similar to that of the plugged honeycomb segment 100 shown in FIG. 2. Note that, the "repeating array pattern similar to that of the plugged honeycomb segment 100 shown in FIG. 2" means a repeating array pattern in which four inflow cells having a hexagonal cross section are arranged so as to surround an outflow cell having a square cross section.

Next, the obtained honeycomb segment was dried by high frequency dielectric heating and then dried at 120° C. for 2 hours using a hot air dryer. Note that, at the time of drying, the honeycomb segment was arranged such that the outflow end face of the honeycomb segment was oriented vertically downward, and dried.

Plugging portions were formed on the dried honeycomb segment. First, a mask was applied to the inflow end face of the honeycomb segment. Next, the masked end portion (end portion on the inflow end face side) was immersed in a plugging slurry, and the open ends of the unmasked cells (outflow cells) were filled with the plugging slurry. In this way, the plugging portions were formed on the inflow end face side of the honeycomb segment. Then, plugging portions were formed on the inflow cells in the same manner on the outflow end face of the dried honeycomb segment.

Then, the honeycomb segment having the plugging portions was degreased and fired to obtain a plugged honeycomb segment. The degreasing condition was 550° C. for 3 hours, and the firing condition was 1,450° C. for 2 hours under an argon atmosphere.

In the manufactured plugged honeycomb segment, the shape of an inflow cell 2a was a hexagon and the shape of an outflow cell 2b was a square, similarly to the plugged honeycomb segment 200 shown in FIG. 6. Further, the structure was such that that one outflow cell 2b was surrounded by four inflow cells 2a so that one side of the inflow cell 2a and one side of an adjacent outflow cell 2b had the same length and became parallel except for the region of the outermost circumference of the honeycomb segment 4. The column of "Cell structure (reference drawing)" in Table 1 indicates a drawing for referring to the cell shape and the cell arrangement of the plugged honeycomb segment.

In the manufactured plugged honeycomb segment, the cross section orthogonal to the axial direction was a quadrangle, and the end face of the quadrangle had a side length of 39.0 mm and another side length of 39.0 mm. Further, the honeycomb segment had a length in the axial direction of 254.5 mm.

The thickness of the outermost circumferential wall of the plugged honeycomb segment differed between a thickness T1 (mm) of the outermost circumferential wall in contact with an incomplete cell and a thickness T2 (mm) of the outermost circumferential wall in contact with a complete cell. Such a plugged honeycomb segment is described as "Non-uniform" in the column of "Thickness of outermost circumferential wall" in Table 1. Note that, if the thickness T1 (mm) of the outermost circumferential wall in contact with the incomplete cell and the thickness T2 (mm) of the outermost circumferential wall in contact with the complete cell are the same, "Uniform" is written in the column of "Thickness of outermost circumferential wall" in Table 1. The thickness T1 (mm) of the outermost circumferential wall in contact with the incomplete cell was 0.400 mm. The thickness T2 (mm) of the outermost circumferential wall in contact with the complete cell was 0.700 mm. Further, the value of "T2−(½×WT)" was 0.611. Table 1 shows each value. Further, the outermost circumferential wall having the thickness of T2 (mm) was present at a position forming a side on the end face of the honeycomb segment.

A thickness (WT (mm)) of the partition wall of the plugged honeycomb segment was 0.178 mm. The cell density was 46 cells/cm². The porosity of the partition wall was 48%. The porosity of the partition wall was measured by Autopore 9500 (trade name) manufactured by Micromeritics.

Forty-nine fired plugged honeycomb segments were arranged so that their side faces were opposed to each other, bonded by bonding materials, and dried at 140° C. for 2 hours to obtain a honeycomb segment bonded body. After the circumference of the obtained honeycomb segment bonded body was ground into a cylindrical shape, the circumferential face thereof was coated with a coating material, and dried and cured at 700° C. for 2 hours to manufacture a plugged honeycomb structure of Example 1. As the bonding material, a material containing inorganic particles and an inorganic adhesive as main components and an organic binder, a surfactant, a foamable resin, water, and the like as sub-components was used. In the plugged honeycomb structure of Example 1, the diameter of the end face was 266.7 mm and the length in the cell extending direction was 254 mm. The column of "Size of plugged honeycomb structure (mm×mm)" in Table 1 indicates the diameter of the end face and the length in the cell extending direction.

wet-milled with a ball mill. A catalyst slurry was prepared by adding 10 g of alumina sol as a binder to the obtained crushed particles. This catalyst slurry was prepared to have a viscosity of 5 mPa·s. Then, the plugged honeycomb structure was immersed in the obtained catalyst slurry. Then, the plugged honeycomb structure was taken out from the catalyst slurry, dried at 120° C. for 2 hours, and baked at 550° C. for 1 hour to obtain the honeycomb catalyst body. After that, a portion of the obtained honeycomb catalyst body where the plugging portions on the outflow end face side were arranged was cut to prepare a sample piece for catalyst clogging evaluation. Light is transmitted from one end face of the prepared sample piece, and the number of clogging outflow cells among the outflow cells formed in the sample piece is counted. Then, evaluation was performed based on the following evaluation criteria.

Evaluation "A": When there is no clogging outflow cell (when there is no catalyst clogging in the outflow cell).

Evaluation "B": When there is a clogging outflow cell and the ratio of the number of clogging outflow cells to the total number of outflow cells is less than 0.05%.

Evaluation "C": When there is a clogging outflow cell and the ratio of the number of clogging outflow cells to the total number of outflow cells is 0.05% or more.

(Tightening Strength)

First, the isostatic strength of the plugged honeycomb structure was measured. The measurement of the isostatic strength was performed based on the isostatic breaking strength test specified by M505-87, which is an automobile standard (JASO standard) issued by Society of Automotive Engineers of Japan, Inc. Specifically, first, the plugged honeycomb structure is placed in a rubber cylindrical container, and the cylindrical container is covered by an alu-

TABLE 1

| | Thickness of partition wall (WT) (mm) | Cell density (cells/cm²) | Cell structure (reference drawing) | Porosity (%) | Size of plugged honeycomb structure (mm × mm) | Thickness of outermost circumferential wall | T1 (mm) | T2 (mm) | T2 − (½ × WT) | Position of T2 |
|---|---|---|---|---|---|---|---|---|---|---|
| Comparative Example 1 | 0.178 | 46 | FIG. 6 | 48 | 266.7 × 254 | Non-uniform | 0.100 | 0.189 | 0.100 | Side |
| Comparative Example 2 | 0.178 | 46 | FIG. 6 | 48 | 266.7 × 254 | Uniform | 1.000 | — | — | — |
| Comparative Example 3 | 0.100 | 46 | FIG. 6 | 48 | 266.7 × 254 | Non-uniform | 0.100 | 0.189 | 0.139 | Side |
| Example 1 | 0.178 | 46 | FIG. 6 | 48 | 266.7 × 254 | Non-uniform | 0.400 | 0.700 | 0.611 | Side |
| Example 2 | 0.178 | 46 | FIG. 6 | 48 | 266.7 × 254 | Non-uniform | 0.300 | 0.500 | 0.411 | Side |
| Example 3 | 0.178 | 46 | FIG. 6 | 30 | 266.7 × 254 | Non-uniform | 0.400 | 0.700 | 0.611 | Side |
| Example 4 | 0.178 | 46 | FIG. 6 | 70 | 266.7 × 254 | Non-uniform | 0.400 | 0.700 | 0.611 | Side |
| Example 5 | 0.100 | 46 | FIG. 6 | 48 | 266.7 × 254 | Non-uniform | 0.400 | 0.700 | 0.650 | Side |
| Example 6 | 0.450 | 46 | FIG. 6 | 48 | 266.7 × 254 | Non-uniform | 0.400 | 0.700 | 0.475 | Side |
| Example 7 | 0.250 | 46 | FIG. 6 | 48 | 266.7 × 254 | Non-uniform | 0.400 | 0.700 | 0.575 | Side |
| Example 8 | 0.178 | 46 | FIG. 2 | 48 | 266.7 × 254 | Non-uniform | 0.300 | 0.500 | 0.411 | Corner |

The plugged honeycomb structure of Example 1 was evaluated for "catalyst clogging of outflow cell", "tightening strength", "pressure loss", and "bonding strength" by the following method. Further, comprehensive evaluation was performed by the following method based on the evaluation results of "catalyst clogging of outflow cell", "tightening strength", "pressure loss", and "bonding strength". The results are shown in Table 2.

(Catalyst Clogging of Outflow Cell)

First, a catalyst was loaded on the plugged honeycomb structure by the following method to obtain a honeycomb catalyst body. One kg of water was added to 100 g of γ-alumina having an average particle diameter of 5 μm, and minum plate. Then, the cylindrical container is put into water and applied isostatic pressure. The isostatic strength measured by the isostatic breaking strength test is indicated by a pressure value (MPa) when the plugged honeycomb structure breaks. Then, evaluation was performed based on the following evaluation criteria.

Evaluation "A": When an improvement of +10% or more was observed with respect to the isostatic strength of the plugged honeycomb structure of Comparative Example 1.

Evaluation "B": When an improvement of +5% or more and less than 10% was observed with respect to the isostatic strength of the plugged honeycomb structure of Comparative Example 1.

Evaluation "C": When an improvement of less than +5% was observed with respect to the isostatic strength of the plugged honeycomb structure of Comparative Example 1.

Evaluation "D": When a decrease of less than −40% was observed with respect to the isostatic strength of the plugged honeycomb structure of Comparative Example 1 (note that, including the case where the isostatic strength is the same).

Evaluation "E": When a decrease of −40% or more was observed with respect to the isostatic strength of the plugged honeycomb structure of Comparative Example 1.

(Pressure Loss)

Air was ventilated from the inflow end face side of the plugged honeycomb structure so that the flow rate was 15 Nm³/min, and the differential pressure between the inflow end face side and the outflow end face side of the plugged honeycomb structure was measured. The measured pressure difference was used as the pressure loss of the plugged honeycomb structure, and the evaluation was performed based on the following evaluation criteria.

Evaluation "A": When the value was equal to or less than the pressure loss of the plugged honeycomb structure of Comparative Example 1.

Evaluation "B": When, assuming that the pressure loss of the plugged honeycomb structure of Comparative Example 1 is 100%, the value of the pressure loss exceeds 100% and is less than 130%.

Evaluation "C": When, assuming that the pressure loss of the plugged honeycomb structure of Comparative Example 1 is 100%, the value of the pressure loss is 130% or more.

Evaluation "A": When an improvement of +15% or more was observed with respect to the bonding strength of the bonding layer of the plugged honeycomb structure of Comparative Example 1.

Evaluation "B": When an improvement of +10% or more and less than 15% was observed with respect to the bonding strength of the bonding layer of the plugged honeycomb structure of Comparative Example 1.

Evaluation "C": When an improvement of +5% or more and less than +10% was observed with respect to the bonding strength of the bonding layer of the plugged honeycomb structure of Comparative Example 1.

Evaluation "D": When an improvement of less than +5% was observed or an improvement was not observed with respect to the bonding strength of the bonding layer of the plugged honeycomb structure of Comparative Example 1.

(Comprehensive Evaluation)

The following comprehensive evaluation was performed on the sum of the scores of each evaluation, assuming that, regarding each evaluation result of "Catalyst clogging of outflow cell", "Tightening strength", "Pressure loss", and "Bonding strength", 5 points is A, 4 points is B, 3 points is C, 2 points is D, and 1 point is E.

Evaluation "A": The sum is 20 points.

Evaluation "B": The sum is 16 points or more and less than 19 points.

Evaluation "C": The sum is 14 points or more and less than 16 points.

Evaluation "D": The sum is less than 14 points.

TABLE 2

|  | Catalyst clogging of outflow cell | Tightening strength | Pressure loss | Bonding strength | Overall points | Comprehensive evaluation |
|---|---|---|---|---|---|---|
| Comparative Example 1 | A | — | — | — | — | — |
| Comparative Example 2 | C | B | B | D | 13 | D |
| Comparative Example 3 | A | E | A | D | 13 | D |
| Example 1 | A | B | A | B | 18 | B |
| Example 2 | A | B | A | A | 19 | A |
| Example 3 | A | A | C | B | 17 | B |
| Example 4 | A | D | A | B | 16 | B |
| Example 5 | A | D | A | B | 16 | B |
| Example 6 | B | A | C | B | 16 | B |
| Example 7 | B | A | B | B | 17 | B |
| Example 8 | A | A | A | A | 20 | A |

(Bonding Strength)

First, the bonding strength of the bonding layer of the plugged honeycomb structure was measured by the following method. First, a measurement sample obtained by bonding two honeycomb segments bonded under the same conditions as the plugged honeycomb structure of Example 1 was prepared. Next, the prepared measurement sample was fixed to a shear load measuring device in the following state. The measurement sample was fixed to the shear load measuring device under a state in which one honeycomb segment was floated among the two honeycomb segments of the measurement sample. Next, a load is applied in the entire length direction of the honeycomb segment from the end face (that is, the face in which the cells are open) of the honeycomb segment in the floating state, and the breaking strength of the measurement sample at the bonding portion where the two honeycomb segments are bonded was measured. The strength thus measured was defined as the bonding strength of the bonding layer. Then, evaluation was performed based on the following evaluation criteria.

Examples 2 to 8

Plugged honeycomb structures were manufactured in the same method as in Example 1 except that the structure of the plugged honeycomb segment was changed as shown in Table 1. Note that, in the plugged honeycomb structure of Example 8, an outermost circumferential wall having a thickness of T2 (mm) was present at a position forming a corner on an end face of a honeycomb segment.

Comparative Example 1

Plugged honeycomb structures were manufactured in the same method as in Example 1 except that the structure of the plugged honeycomb segment was changed as shown in Table 1.

Comparative Example 2

Plugged honeycomb structures were manufactured in the same method as in Example 1 except that the structure of the plugged honeycomb segment was changed as shown in Table 1. Note that, in the plugged honeycomb structure of Comparative Example 2, a thickness T1 (mm) of an outermost circumferential wall in contact with an incomplete cell and a thickness T2 (mm) of the outermost circumferential wall in contact with a complete cell were the same.

Comparative Example 3

Plugged honeycomb structures were manufactured in the same method as in Example 1 except that the structure of the plugged honeycomb segment was changed as shown in Table 1.

The plugged honeycomb structures of Examples 2 to 8 and Comparative Examples 1 to 3 were evaluated for "Catalyst clogging of outflow cell", "Tightening strength", "Pressure loss", "Bonding strength", and "Comprehensive evaluation" by the same method as in Example 1. The results are shown in Table 2.

(Results)

The plugged honeycomb structures of Examples 1 to 8 were able to obtain good results in each of all of the evaluations of "Catalyst clogging of outflow cell", "Tightening strength", "Pressure loss", and "Bonding strength". On the other hand, the plugged honeycomb structure of Comparative Example 2 was extremely low in "Catalyst clogging of outflow cells" and "Bonding strength". Further, the plugged honeycomb structure of Comparative Example 3 was extremely low in "Tightening strength" and "Bonding strength".

INDUSTRIAL APPLICABILITY

The plugged honeycomb segment and the plugged honeycomb structure of the present invention can be used as a filter for purifying exhaust gas.

DESCRIPTION OF REFERENCE NUMERALS

1: partition wall, 2: cell, 2a: inflow cell, 2b: outflow cell, 2x: complete cell, 2y: incomplete cell, 3: outermost circumferential wall, 4: honeycomb segment, 5: plugging portion, 11: inflow end face, 12: outflow end face, 100,200: plugged honeycomb segment, 101: bonding layer, 102: plugged honeycomb segment bonded body, 103: bonded-body circumferential wall, 111: inflow end face, 112: outflow end face, 300: plugged honeycomb structure, T1: thickness (thickness of outermost circumferential wall in contact with incomplete cell), T2: thickness (thickness of outermost circumferential wall in contact with complete cell), WT: thickness (thickness of partition wall).

What is claimed is:

1. A plugged honeycomb segment comprising:
a honeycomb segment having a quadrangular prism shape which includes porous partition walls arranged so as to surround a plurality of cells extending from an inflow end face to an outflow end face, and an outermost circumferential wall arranged at an outermost circumference; and
a plugging portion arranged at any one end of the inflow end face or the outflow end face of each of the plurality of cells, wherein
a porosity of each of the porous partition walls is 30 to 70%,
a cell of the plurality of cells in which the plugging portion is arranged at an end on the outflow end face is an inflow cell, and a cell of the plurality of cells in which the plugging portion is arranged at an end on the inflow end face is an outflow cell,
in a cross section orthogonal to an extending direction of the plurality of cells, a shape of the inflow cell surrounded by the porous partition walls is a hexagon, and a shape of the outflow cell surrounded by the porous partition walls is a square,
the plurality of cells have a structure that one outflow cell is surrounded by four inflow cells so that one side of a predetermined inflow cell and one side of an adjacent outflow cell have the same length and become parallel except for a region of the outermost circumference of the honeycomb segment,
outermost circumference cells of the plurality of cells which are located at the outermost circumference of the honeycomb segment consist of complete cells having the same shape as remaining cells of the plurality of cells, wherein the remaining cells are cells of the plurality of cells other than the outermost circumference cells each of which is surrounded by the porous partition walls, and incomplete cells having an incomplete shape in which a part of the shape of complete cells is divided by the outermost circumferential wall,
wherein a thickness of the outermost circumferential wall in contact with each of the incomplete cells is T1 (mm), a thickness of the outermost circumferential wall in contact with each of the complete cells is T2 (mm), and a thickness of each of the porous partition walls is WT (mm), the relationships of the following expression (1) and the following expression (2) are satisfied:

$$0.200 \text{ mm} < T1 < T2 - (\tfrac{1}{2} \times WT) \quad \text{Expression (1)}$$

$$T2 \leq 0.700 \text{ mm, and} \quad \text{Expression (2):}$$

a value of T1 corresponds to a thickness between a side of the incomplete cells formed by an inner surface of the outermost circumferential wall and an outer surface of the outermost circumferential wall, and a value of T2 corresponds to a thickness between a side of the complete cells formed by the inner surface of the outermost circumferential wall and the outer surface of the outermost circumferential wall.

2. The plugged honeycomb segment according to claim 1, wherein the outermost circumferential wall having the thickness of T2 (mm) is located at at least a corner of the inflow end face of the honeycomb segment.

3. The plugged honeycomb segment according to claim 1, wherein the thickness of each of the porous partition walls is 0.100 to 0.450 mm.

4. The plugged honeycomb segment according to claim 1, wherein a cell density is 15 to 78 cells/cm$^2$.

5. A plugged honeycomb structure comprising:
a plurality of plugged honeycomb segments according to claim 1;
a bonding layer that bonds side faces of the plurality of plugged honeycomb segments to each other; and
a bonded-body circumferential wall arranged so as to surround side faces of a bonded body of the plurality of plugged honeycomb segments bonded by the bonding layer.

* * * * *